United States Patent [19]
Lai

[11] Patent Number: 5,673,773
[45] Date of Patent: Oct. 7, 1997

[54] STRUCTURE OF A DRUM BRAKE FOR BICYCLES

[75] Inventor: I-Tai Lai, Feng-Yuan, Taiwan

[73] Assignee: Valisum Industries Ltd., Taiwan

[21] Appl. No.: 585,460

[22] Filed: Jan. 16, 1996

[51] Int. Cl.⁶ .................................................. B62L 5/00
[52] U.S. Cl. ............................... 188/24.17; 188/26
[58] Field of Search .............................. 188/17, 24.14, 188/24.17, 26, 74, 323, 324

[56] References Cited

U.S. PATENT DOCUMENTS 2,072,852  3/1937  Batten et al. ................. 188/323 X
5,535,855  7/1996  Hanada ............................ 188/26 X Primary Examiner—Robert J. Oberleitner
Assistant Examiner—Pamela J. Lipka
Attorney, Agent, or Firm—Alfred Lei

[57] ABSTRACT

A drum brake for bicycles including a cylindrical hub having a flange at both sides and a circular recess at an end thereof, a screw rod extending through the hub and supported by a bearing arranged within the hub, brake means including a rotor and three brake blocks fitted on the screw rod and installed with the circular recess, a positioning plate provided with three guide rods adapted to be slidably engaged with respective hole of the brake blocks, an arm having a square opening receiving the square portion, a torsion spring bearing against the arm, and a cover fixedly mounted on the positioning plate, whereby the bicycle can be effectively reduced in speed or stopped in motion.

1 Claim, 6 Drawing Sheets

STRUCTURE OF A DRUM BRAKE FOR BICYCLES

BACKGROUND OF THE INVENTION

1. Field of the Invention

This invention relates to an improvement in the structure of a drum brake for bicycles.

2. Description of the Prior Art

The structure of a most commonly used drum brake is illustrated in FIG. 7. As shown, the drum brake 30 utilizes an arm 35 to rotate a rectangular block 34 to drive a pair of brake shoes 31 which are connected at an end by a pivot 32 thereby expanding the brake shoes 31 to contact the inner surface of a hub 20 and therefore reducing speed or stopping motion of a bicycle. Further, two springs 33 are provided for returning the brake shoes 31 to their original positions when the brake is released.

However, such a drum brake suffers from the following drawbacks:

1. The contact area between the brake shoes 31 and the inner surface of the hub is small thereby making it impossible to apply brake effectively.

2. Once the brake shoes are worn out and the rectangular block 34 is not adjusted in time, brake failure will easily occur.

Therefore, it is an object of the present invention to provide am improvement in the structure of a drum brake for bicycles which can obviate and mitigate the above-mentioned drawbacks.

SUMMARY OF THE INVENTION

This invention relates to an improvement in the structure of a drum brake for bicycles.

It is the primary object of the present invention to provide an improvement in the structure of a drum brake for bicycles which can effectively reduce the speed or stop the motion of bicycle.

It is another object of the present invention to provide an improvement in the structure of a drum brake for bicycles which is sensitive in operation.

It is still another object to provide an improvement in the structure of a drum brake for bicycles which is durable in use.

It is still another object to provide an improvement in the structure of a drum brake for bicycles which is easy to assemble.

It is a further object of the present invention to provide an improvement in the structure of a drum brake for bicycles which is low in cost.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
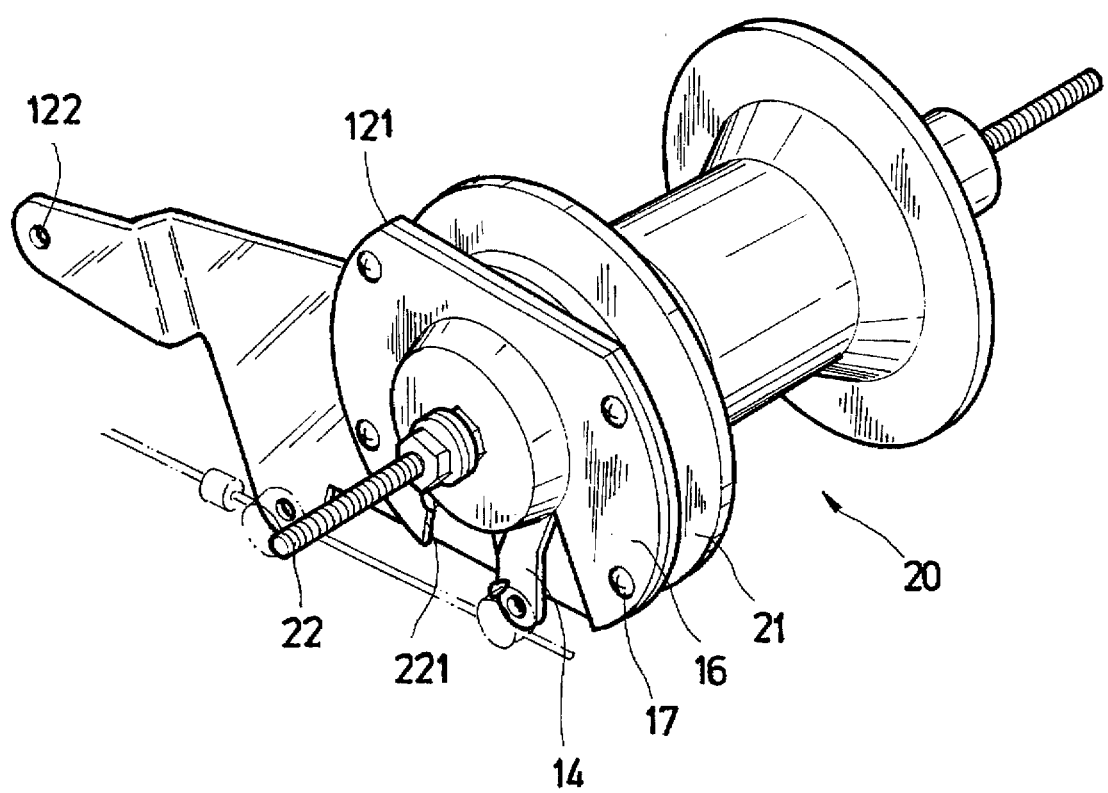
FIG. 1 is a perspective view of the present invention.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
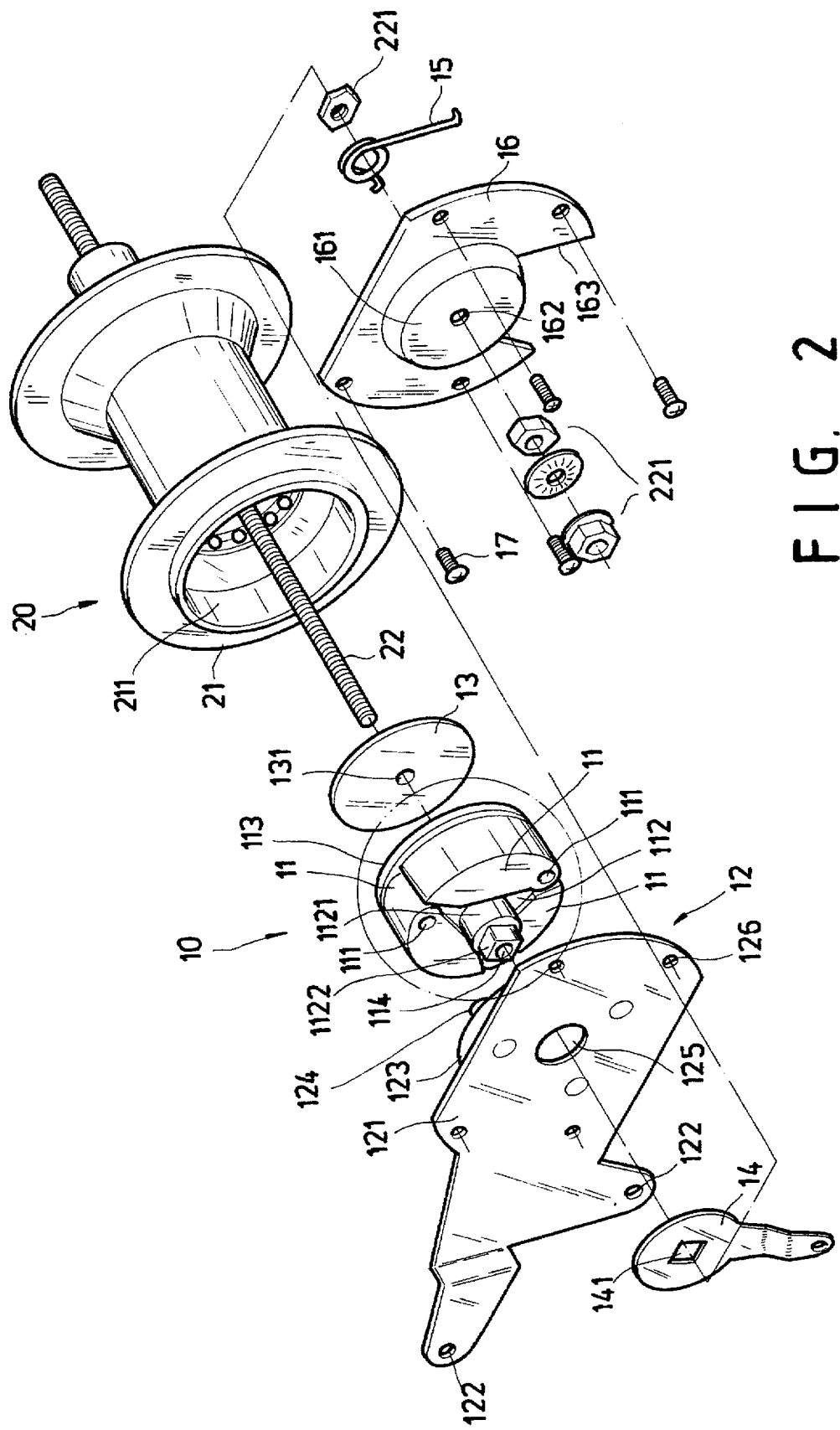
FIG. 2 is an exploded view of the present invention.
Figure 3:
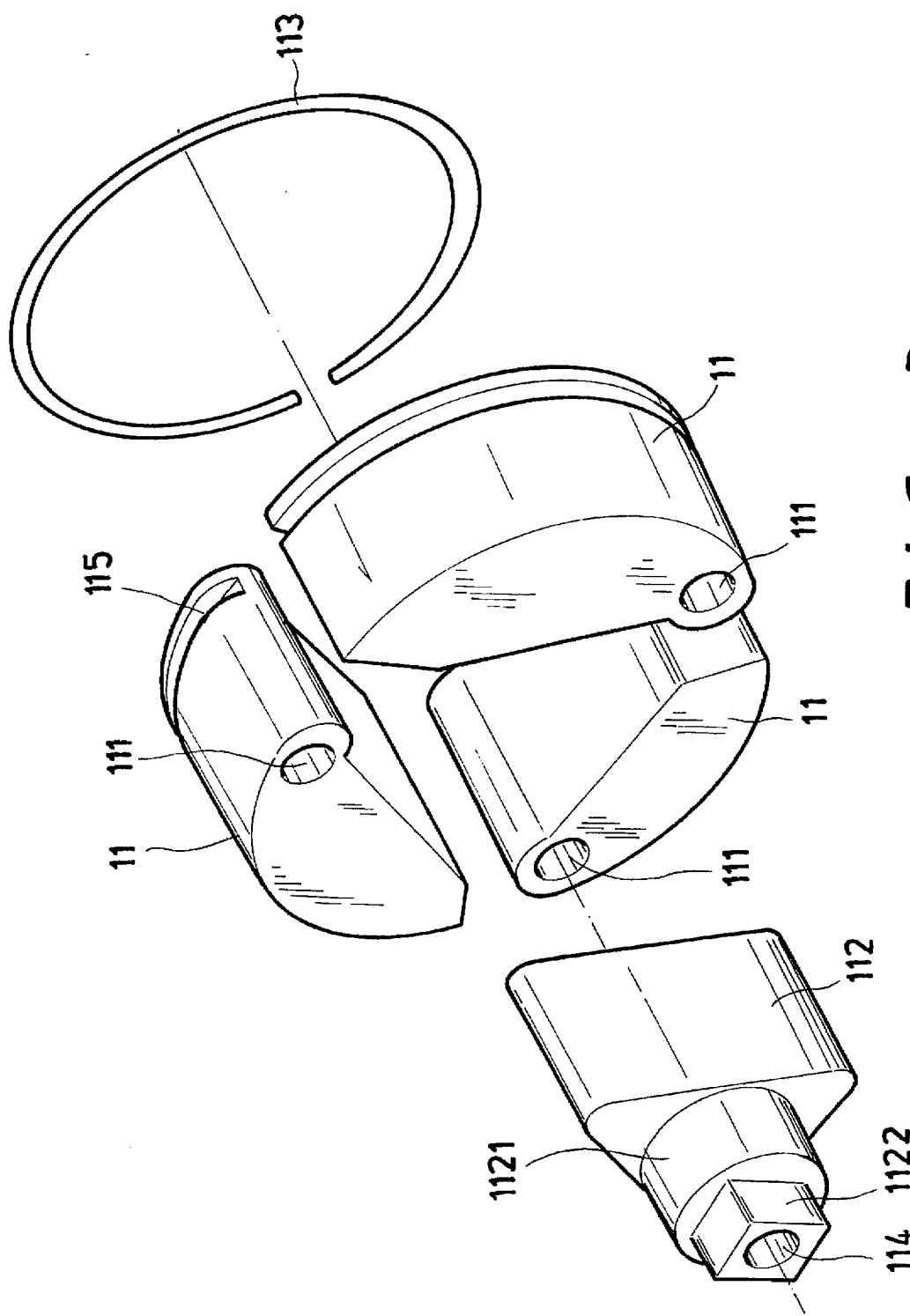
FIG. 3 is an exploded view of the triangular rotor.
Figure 4:
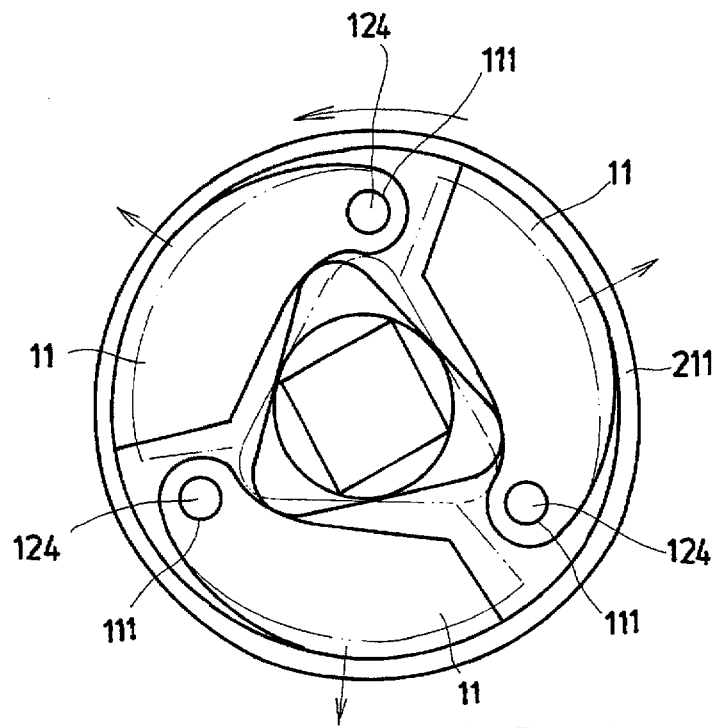
FIG. 4 illustrates the working principle of the present invention.

With reference to the drawings and in particular to FIGS. 1, 2 and 3 thereof, the drum brake for bicycles according to the present invention mainly comprises a a hub 20 and a brake means 10.

The hub 20 is a cylindrical member with a flange 21 at both sides and a circular recess 211 at one end thereof. A screw rod 22 extends through the hub 10 and is supported by a bearing (not shown) arranged within the hub 20. A circular packing 13 is formed with a center hole 131 and disposed within the circular recess 211 of the hub 20, with the screw rod 22 extending through the center hole 131.

A brake means 10 which includes three brake blocks 11 is fitted on the screw rod 22 and installed within the circular recess 211 of the hub 21. Each of the brake blocks 11 is formed with a curved surface at the outer side, a flat surface at the inner side, a hole 111 at an end, and a curved groove 115 along the curved surface. The three brake blocks 11 are arranged together by engaging a retainer ring 113 with the grooves 115 of the brake blocks 11 so that there is a triangular space between the brake blocks 11. A triangular rotor 112 is fitted into the triangular space between the brake blocks 11. The triangular rotor 112 is formed with a cylindrical portion 1121 at an end and a square portion 1122 at an end of the cylindrical portion 1121. Further, the triangular rotor 112 has an axial through hole 114 for the passage of the screw rod 22.

Figure 5:
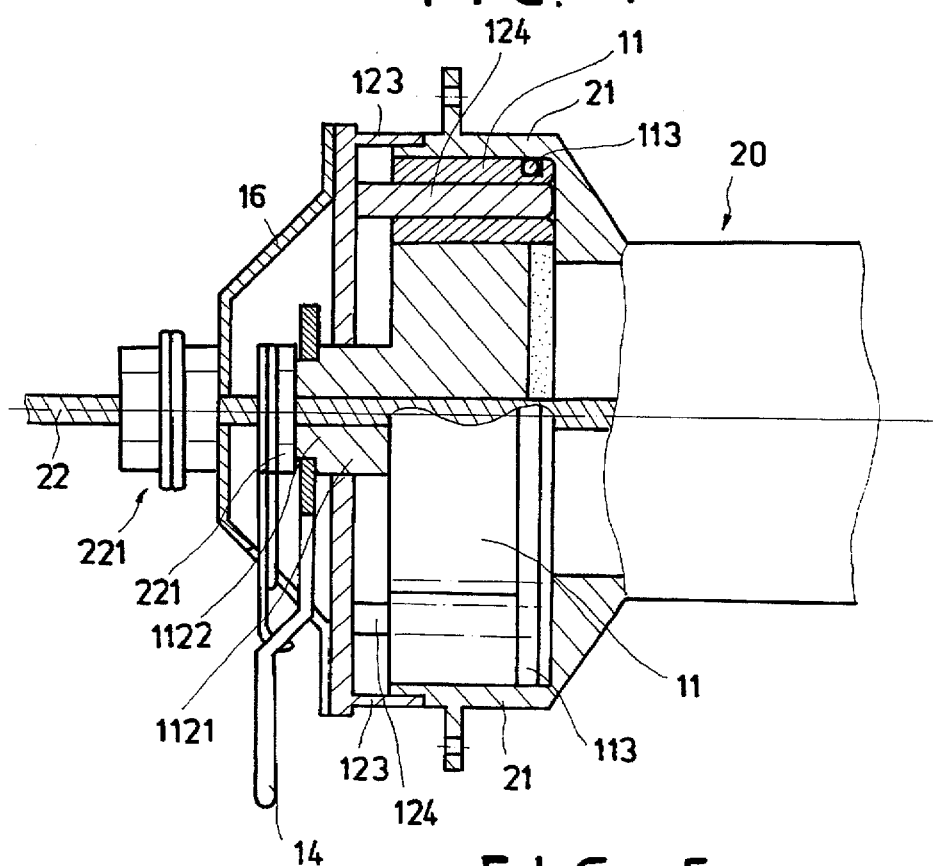
FIG. 5 is a sectional view of the present invention.
Figure 6:
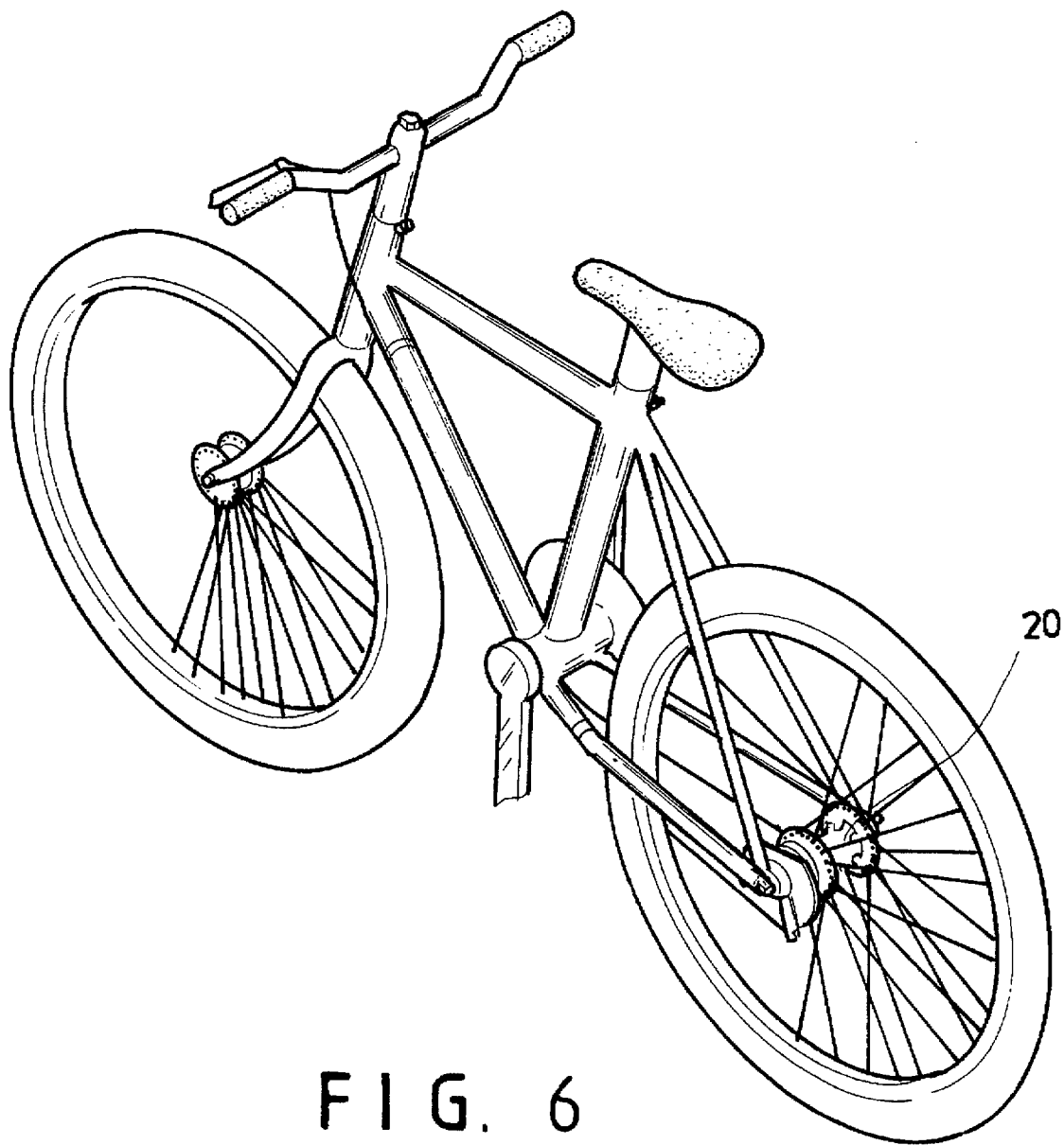
FIG. 6 is a working view of the present invention.
Figure 7:
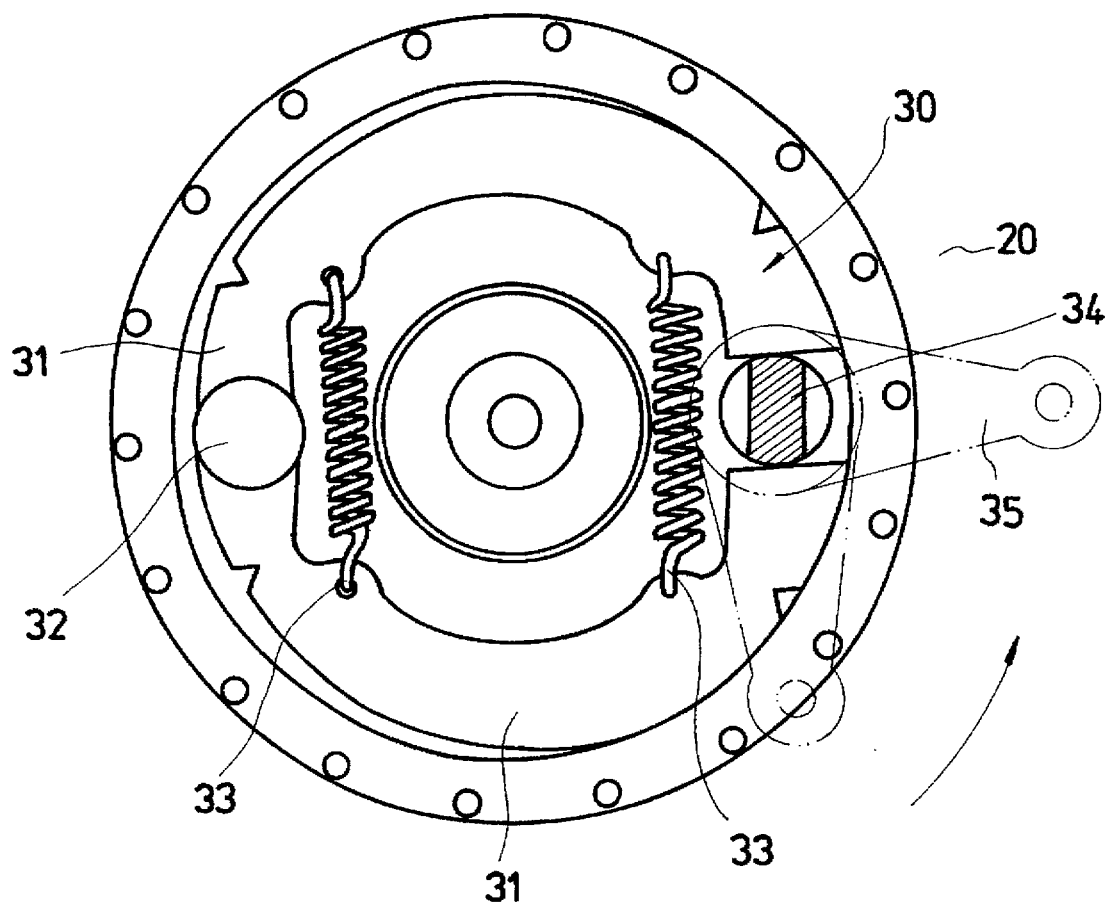
FIG. 7 illustrates the structure of a prior art drum brake for bicycles.

A positioning means 12 including a positioning plate 121 is mounted on the brake means 10. On the right side (see FIGS. 2 and 5) of the positioning plate 121 there is a tubular portion 123 having three guide rods 124. The positioning plate 121 has an opening 125 coaxial with the tubular portion 123 for the passage of the screw rod 22, the cylindrical portion 1121 and the square portion 1122. The guide rods 124 of the positioning plate 121 are slidably inserted into the holes 111 of the brake blocks 11. The square portion 1122 of the triangular rotor 112 extends through the positioning plate 121 to engage with a square hole 141 of an arm 14. The arm 14 is designed to be connected to a brake cable (not shown). A nut 221 is engaged with the screw rod 22 to prevent the arm 14 from being disengaged from the triangular rotor 112. A torsion spring 15 is fitted over the screw rod 22, abutting against the nut 221. A cover 16 having a protruded portion 161 at the central portion is fixedly mounted on the positioning plate 121 by bolts 17, with the screw rod 22 extending through the center hole 162 of the cover 16. The cover 16 has a notch 163 for engaging with a leg of the torsion spring 15. The other leg of the torsion spring 15 is engaged with the arm 14. Two nuts 221 are mounted on the screw rod 22 for fixing the cover 16 on the positioning plate 121.

When the brake cable is pulled to apply brake, the arm 14 will be first rotated thereby turning the triangular rotor 112. In the meantime, the brake blocks 11 will be forced by the triangular rotor 112 to go outwards thus bearing against the inner side of the hub 20. Hence, the hub 20 will be reduced in speed or stopped in motion. As the brake cable is released, the torsion spring 15 will return the arm 14 to its original position which will in turn rotate the triangular rotor 112 to its normal position. Thus, the brake blocks 11 will no longer bear against the inner wall of the hub 20.

However, it should be noted that the triangular rotor 112 may be replaced with a polygonal member.

In conclusion, the drum brake according to the present invention has the following advantages over the prior art:

1. The drum brake utilizes three brake blocks to contact the inner wall of the hub thereby providing a larger contact area between the brake blocks and the inner wall of the hub than the prior art and therefore making more effective to apply the brake.

2. The three brake blocks will apply forces on the inner wall of the hub evenly and this will increase the braking sensitivity and shorten the time for stopping motion of a bicycle.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constitutiug technical equivalents of the means described as well as their combinations.

I claim:

1. A drum brake for bicycles comprising:

a cylindrical hub having a flange at both sides and a circular recess at an end thereof;

a screw rod extending through said hub and supported by a bearing arranged within said hub;

a circular packing disposed within said circular recess of said cylindrical hub and having a center hole receiving said screw rod;

brake means including a triangular rotor and three brake blocks fitted on said screw rod and installed within said circular recess, each of said brake blocks being formed with a curved surface at an outer side, a flat surface at an inner side, a hole at an end and a curved groove along said curved surface, said three brake blocks being arranged together by engaging a retainer ring with said groove thereby forming a triangular space between said brake blocks, said triangular rotor being fitted in said space and having a triangular portion, a square portion at an end thereof, a cylindrical portion between said triangular portion and said square portion, and an axial through hole receiving said screw rod;

a positioning plate formed at one side thereof with a tubular portion having three guide rods adapted to be slidably engaged with respective holes of said brake blocks, said positioning plate having an opening coaxial with said tubular portion and receiving said screw rod, said cylindrical portion and said square portion of said triangular rotor;

an arm having a square opening receiving said square portions;

a first nut engaged with said screw rod to prevent said arm from being disengaged from said triangular rotor;

a torsion spring fitted over said screw rod and abutting against said first nut, said torsion spring having a first leg and a second legs;

a cover having a protruded portion, a central portion thereof and a center hole and being fixedly mounted on said positioning plate by bolts with said screw rod extending through said center hole of said cover, said cover having a notch engaged with said first leg of said torsion spring, said second leg of said torsion spring being engaged with said arms; and two second nuts mounted on said screw rod to fix said cover on said positioning plate.

* * * * *